US009210243B2

(12) United States Patent
Hsu et al.

(10) Patent No.: US 9,210,243 B2
(45) Date of Patent: Dec. 8, 2015

(54) LENS HOLDING DEVICE

(71) Applicant: TDK Taiwan Corporation, Taipei (TW)

(72) Inventors: Shang-Yu Hsu, Taipei (TW); Kun-Shih Lin, Taipei (TW); Fu-Yuan Wu, Taipei (TW)

(73) Assignee: TDK TAIWAN CORPORATION, Taipei (TW)

( * ) Notice: Subject to any disclaimer, the term of this patent is extended or adjusted under 35 U.S.C. 154(b) by 28 days.

(21) Appl. No.: 14/199,578

(22) Filed: Mar. 6, 2014

(65) Prior Publication Data

US 2014/0340775 A1    Nov. 20, 2014

(30) Foreign Application Priority Data

Mar. 11, 2013    (JP) .................................. 2013-048281

(51) Int. Cl.
*G02B 7/02* (2006.01)
*H04M 1/02* (2006.01)
*G02B 7/08* (2006.01)
*H02K 41/035* (2006.01)

(52) U.S. Cl.
CPC .............. *H04M 1/0264* (2013.01); *G02B 7/08* (2013.01); *H02K 41/0356* (2013.01)

(58) Field of Classification Search
USPC .................. 359/694–701, 811–830
See application file for complete search history.

(56) References Cited

U.S. PATENT DOCUMENTS

| 2007/0291380 A1* | 12/2007 | Koyama et al. ............... 359/823 |
| 2008/0247063 A1* | 10/2008 | Otsuki et al. .................. 359/824 |
| 2013/0033124 A1 | 2/2013 | Wang et al. |
| 2013/0176634 A1* | 7/2013 | Dinesen ........................ 359/814 |
| 2013/0194491 A1* | 8/2013 | Kudo ............................. 348/375 |

* cited by examiner

*Primary Examiner* — Mohammed Hasan
(74) *Attorney, Agent, or Firm* — Arent Fox LLP

(57) ABSTRACT

The present invention provides a lens holding device excellent in an impact resistance.

The lens holding device comprising a lens carrier having a cylindrical shape extending in an optical axis direction of a lens and holding said lens at an inner peripheral face side, a coil provided to a coil attaching part formed at an outer peripheral face of said lens carrier, an outer wall part, an inner wall part placed so that said coil is between said outer wall part, a connection part connecting said outer wall part and said inner wall part; and said inner face part has an inner face facing said lens carrier, an outer face facing said coil, and a first side face and a second side face which connects said inner face and said outer face and approximately parallel to each other, further at said outer peripheral face of said lens carrier, a control part is formed which has a main face facing said inner face, a first projection face facing said first side face, and a second projection face facing said second side face.

3 Claims, 6 Drawing Sheets

LENS HOLDING DEVICE

CROSS-REFERENCE TO RELATED APPLICATIONS

This application is based upon and claims the benefit of priority of Japanese Patent Application No. 2013-048281, filed Mar. 11, 2013, the disclosure of the prior application is hereby incorporated in its entirety by reference.

BACKGROUND OF THE INVENTION

1. Field of the Invention

The present invention relates to a lens holding device suitably used, for example, to the camera module or so of the mobile phone or so.

2. Background Art

For the lens holding device which is suitably used for camera module or so of the mobile phone, those having a function which allows the relative movement of the lens carrier so that a focusing movement can be done, is proposed.

As such lens holding device, the improvement relating to the shape of the lens carrier or the yoke are proposed, and for example, the structure of the lens carrier or the yoke for making the assembling of the lens to the lens carrier easier (refer to the patent document 1), and the structure of the octagonal coil and yoke for securing the mounting space of the lens are proposed (refer to the patent document 2).

PATENT DOCUMENTS

[Patent document 1] JP Patent Application Laid Open No. 2009-300902
[Patent document 2] JP Patent Application Laid Open No. 2010-14938

SUMMARY OF THE INVENTION

The Problems to be Solved by the Invention

However, such lens holding device resiliently holds the lens carrier by the spring or so, thus when an impact is applied from the outside, the lens carrier was broken by colliding against surrounding members.

The present invention was achieved in view of such circumstances, and the object thereof is to provide the lens holding device having excellent impact resistance.

Means for Solving the Problem

In order to achieve the above object, the lens holding device of the present invention comprises;
a lens carrier having a cylindrical shape extending in an optical axis direction of a lens and holding said lens at an inner peripheral face side,
a coil provided to a coil attaching part formed at an outer peripheral face of said lens carrier, and
a yoke having an outer wall part extending in a direction approximately parallel to said optical axis direction, an inner wall part extending in a direction approximately parallel to said optical axis direction and provided by placing said coil between said outer wall part which is closer to said lens carrier than said outer wall part, and a connection part extending in the direction approximately perpendicular to said optical axis direction and connecting said outer wall part and said inner wall part; wherein
said inner wall part has an inner face facing said lens carrier, an outer face which is approximately parallel to said inner face and facing said coil, and a first side face and a second side face approximately parallel against each other and connects said inner face and said outer face; and
at said outer peripheral face of said lens carrier, a control part is formed having a main face facing said inner face, a first projection face connected to one of end parts of said main face and faces said first side face by standing up towards said coil side from said main face; and a second projection face connected to other end parts of said main face and faces said second side face by standing up towards said coil side from said main face.

Even when the impact or so is applied from the outside, the in lens holding device according to the present invention, the control part formed at the outer peripheral force of the lens carrier contacts with the inner wall face of the yoke and the impact applied to the lens holding device is absorbed, hence has excellent impact resistance. Particularly, the control part of the lens carrier comprises the inner face of the inner wall part of the yoke, the main face facing the three faces of the first and the second side faces, and the first projection face and the second projection face. Thus, the unexpected movement of the lens carrier due to the impact from the outside is effectively limited, and the lens holding device can be prevented from being damaged. Also, the inclination or the rotation of the lens carrier can be prevented.

Also, for example, said inner face of said inner wall part and said main face of said control part may be planar shape.

By making the inner face of the inner wall part into a planar shape, the space between the inner wall part, and the lens carrier and the coil can be accurately controlled, hence the driving performance of the voice coil motor can be improved, and also the space can be made small; thus it is advantageous for making it smaller.

Also, for example, said first projection face and the second projection face may extend approximately parallel to each other in a direction approximately parallel to said optical axis direction.

By forming the first projection face and the second projection face approximately parallel to the optical direction at the outer peripheral face of the lens, the facing area between the first side face and the second side face of the inner wall part can be larger, thus the impact resistance can be improved. Also, by forming the first projection face and the second projection face, there is an effect to prevent the deformation of the lens carrier of a cylindrical shape.

Also, for example, said yoke may have four said inner wall part and four connection parts placed at positions which are rotated by approximately 90 degrees taking said optical axis at a center, and said outer wall part may connect said four connection parts; and at said outer peripheral face of said lens carrier, four control parts each facing four said inner wall parts may be formed.

Since the outer wall part of the yoke has a structure which connects the four inner wall parts via the connection part, the movement of the lens carrier is controlled in a good balance, and also the impact accompanying the contact between the control part and the inner wall part can be absorbed effectively.

BEST MODE FOR CARRYING OUT THE INVENTION

The First Embodiment

Figure 1:
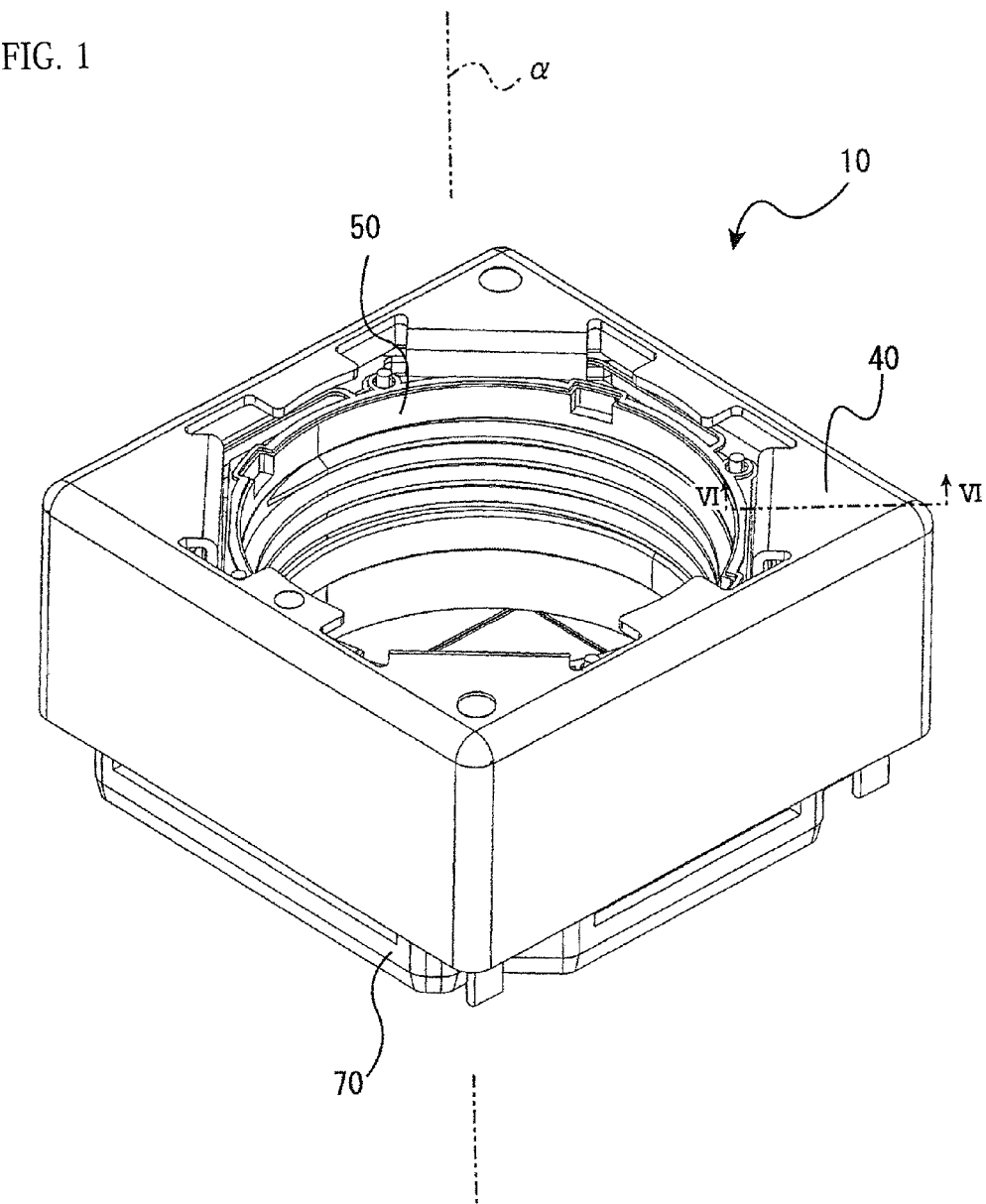
FIG. 1 is a perspective view of the lens holding device according to one end of the embodiment of the present invention.

FIG. 1 is a perspective view of the lens holding device 10 according to one embodiment of the present invention. The lens holding device 10 has an outer shape of approximately parallel piped shape. At the center of the lens holding device, the lens carrier 50 holding the lens, which is not shown in the figure, is placed; and at the outer peripheral side of the lens carrier 50, the yoke 40, the bottom 70 as the base part are placed so that these surround the lens carrier 50.

In the lens holding device 10, the lens carrier 50 which holds the lens is held by the cap 20 (refer to FIG. 2) and the bottom 70 so that the relative movement can be achieved freely. Also, as described in the below, at the inside of the lens holding device 10, the voice coil motor is built in; and the lens holding device 10 allows the relative movement of the lens carrier 50 using the voice coil motor to the optical axis direction with respect to the bottom 70 or so. The lens holding device 10 is used as the camera module or so having the focusing mechanism by combining with the imaging device placed at the exiting side; however the use of the lens holding device 10 is not limited thereto.

Figure 2:
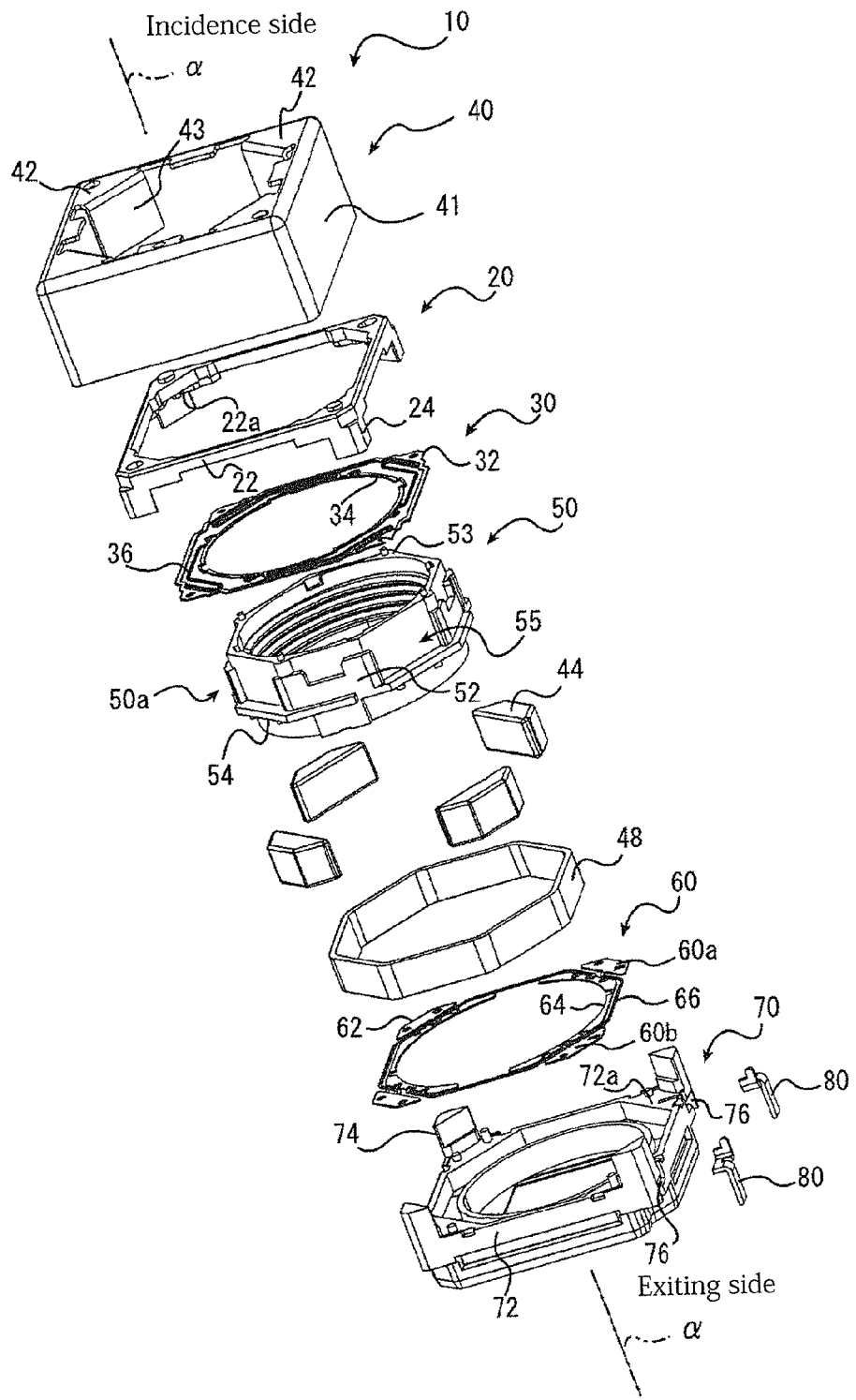
FIG. 2 is an exploded perspective view of the lens holding device shown in FIG. 1.

FIG. 2 is an exploded perspective view of the lens holding device 10 shown in FIG. 1. The lens holding device 10 comprises the yoke 40, the cap 20, the F spring 30, the lens carrier 50, the magnet 44, the coil 48, the B spring 60, the bottom 70 and the connection terminal 80. Note that, for explaining the lens holding device 10, the side where the imaging light enters into the lens along the optical axis α of the lens is defined as the incidence side; and the side where the entered imaging light outgoes is defined as the exiting side.

The yoke 40 is a member which guides the magnetic flux of the magnet 44 to coil 48, and it is produced by the soft magnetic material such as iron or so. For the lens holding device 10 of the present embodiment, the yoke 40 has the outer wall part 41 which is placed at the outside of the cap 20 and the bottom 70, the inner wall part 43 which is placed at the inside by having the coil 48 between the outer wall part 41, and the connection part 42 which connects the outer wall part 41 and the inner wall part 43. Note that, the shape of the yoke 40 is not particularly limited, and it may be a shape that the yoke 40 is placed inside the cap 20 and the bottom 70; and as magnet 44, it may be divided into plurality of members. The detailed shape of the yoke 40 will be described in below.

The cap 20 supports the lens carrier 50 from the incidence side via the F spring 30. The cap 20 has the cap frame part 22 of rectangular frame shape, the cap column part 24 projecting out towards the exiting side of the optical axis α direction from the four corners of the cap frame part 22. At the end face of the exiting side at the cap frame part 22, the F spring providing face 22a is formed. The F spring 22a extends in a direction approximately perpendicular to the optical axis α direction. At the F spring providing face 22a, the outer ring part 32 of the F spring 30 is fixed by the adhesive agent or so. Also, the cap column part 24 of the cap 20 is connected to the bottom part 74 of the bottom 70 by the adhesive agent or so.

The F spring 30 shown in FIG. 2 resiliently connects the cap 20 and the lens carrier 50. The lens carrier 50 is supported so that it can move freely against the bottom 70 to which the cap 20 is fixed, via the F spring 30 and the B spring 60. The F spring 30 has a multistacked ring shape consisting of the outer ring part 32, the inner ring part 34, and the arm part 36.

The outer ring part 32 constituting the outer peripheral part of the F spring 30 is fixed to the F spring providing face 22a of the cap frame part 22. The inner ring part 34 of the F spring 30 is placed at the inner peripheral side than the outer ring part 32, and it is fixed to the incidence side inner ring providing part 53 of the lens carrier 50 by the adhesive agent or so. The outer ring part 32 and the inner ring part 34 are connected by the arm part 36.

The F spring 30 is constituted by the resilient material such as metal or so, and the arm part 36 can change the shape resiliently. As the arm part 36 changes its shape resiliently, the inner ring part 34 can make a relative movement towards the optical axis α direction with respect to the outer ring part 34.

The magnet 44 is provided between the cap frame part 22 of the cap 20, and the bottom frame part 72 of the bottom 70. In the present embodiment, the magnet 44 is placed at the four corners of the lens holding device 10 so that it is close to the cap 20 and the inner peripheral side of the column part 24, 74 of the bottom 70; and when it is assembled, it faces the coil 48 attached to the lens carrier 50 (refer to FIG. 6). The magnet 44 constitutes the voice coil motor for driving the lens carrier 50, together with the yoke 40 and the coil 48.

Figure 5:
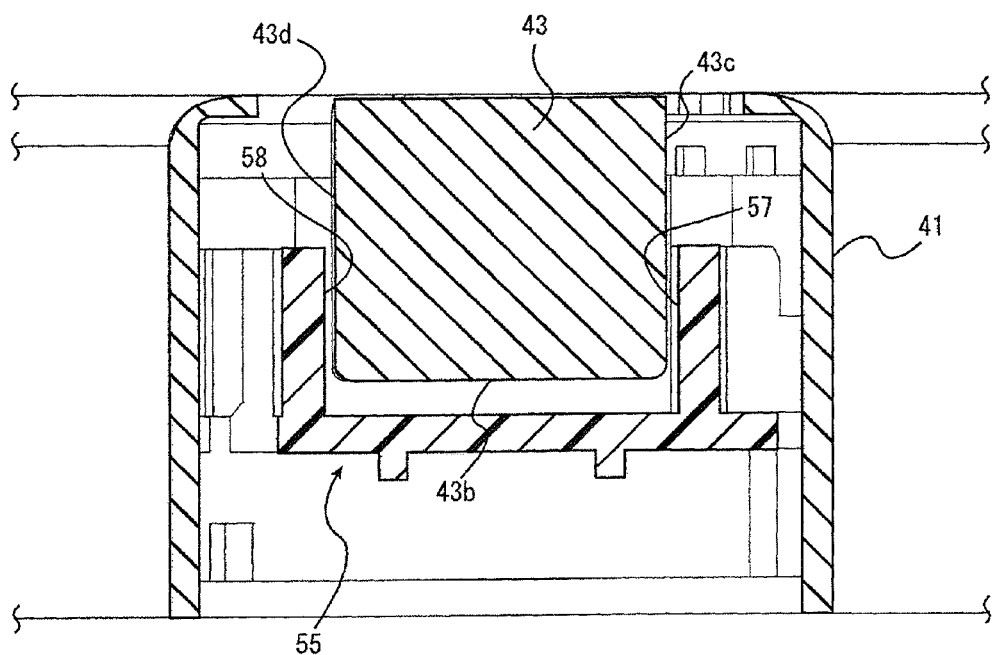
FIG. 5 is a partial cross section showing the cross section along V-V line of FIG. 4.

The coil 48 is fixed to the lens carrier 50 via the coil providing projection 52 formed at the outer peripheral face 50a of the lens carrier 50. Also, the end part of the winding coil constituting the coil 48 is electrically connected to the inner ring part 64 of the B spring 60. Also, as shown in FIG. 5, the connection terminal 80 is electrically connected at the outer ring part 62 of the B spring 60. Therefore, the coil 48 shown in FIG. 2 is supplied with the electric power for driving the lens carrier 50 via the B spring 60 and the connection terminal 80 connected thereto. Note that, the B spring 60 is constituted by two parts of B spring R 60a and the B spring L 60b which are isolated and insulated against each other.

The lens carrier 50 has the cylindrical shape extending in an optical axis α direction of the lens, and holds the lens (not shown in the figure) at the inner peripheral face side. At the end face of the incidence side of the lens carrier 50, the incidence side inner ring providing part 53 is formed; and at the incidence side inner ring providing part 53, the inner ring part 34 of the F spring 30 is fixed. On the other hand, at the end face of the exiting side of the lens carrier 50, the exiting side inner ring providing part 54 is formed, and the inner ring part 64 of the B spring 60 is fixed.

The B spring 60 shown in FIG. 2 resiliently connects the bottom 70 and the lens carrier 50. The B spring 60 is constituted by two parts of B spring R 60a and the B spring L 60b which are isolated and insulated against each other; and it functions as a part of the wiring coil for supplying the electric power to the coil 48. Except that the B spring 60 is separated into 2 parts, it has similar structure as the F spring 30, and consists of the outer ring part 62, the inner ring part 64 and the arm part 66.

The outer ring part 62 constituting the outer peripheral portion of the B spring 60 is fixed at the B spring providing face 72a of the bottom frame part 72. The inner ring part 64 of the B spring 60 is placed at the inner peripheral side than the outer ring part 62, and fixed at the exiting side inner ring providing part 54 of the lens carrier 50 by adhesive agent or so. The outer ring part 62 and the inner ring part 64 are connected by the arm part 66.

The B spring 60 is constituted by the resilient material such as the metal or so as similar to the F spring 30, and the arm part 66 can deform resiliently. As the arm part 66 deforms resiliently, the inner ring part 64 can make a relative movement to the optical axis α direction with respect to the outer ring part 62.

The bottom 70 supports the lens carrier 50 so that the relative movement can be made, via the B spring 60 and the F spring 30 which is connected via the cap 20. The bottom 70 is formed with the through hole at the center part; and comprises the bottom frame part 72 having an outer peripheral shape of approximately rectangular shape from the view point of optical axis α direction, and the bottom column part 74 projecting out to the incidence side of the optical axis α direction from the four corners of the bottom frame part 72. The bottom 70 comprises the B spring providing face 72a at an end face of the incidence side of the bottom frame part 72. The B spring providing face 72a extends in a direction which is approximately perpendicular to the optical axis α direction, and the outer ring part 62 of the B spring 60 is provided. Also, at the bottom side face 75 which is the side face of the bottom frame part 72, the housing groove 76 for assembling and providing the connection terminal 80 is formed.

The connection terminal 80 functions as the electric power supplying terminals for supplying the electric power to the voice coil motor of the lens holding device 10 from the outside, by being provided fixed to the bottom 70. That is, one of the end part (the end part of the incidence side) of the connection terminals 80 is electrically connected to the outer ring part 62 of the B spring 60; and the other end part (the end part of the exiting side) is electrically connected to the outer substrate or so which is not shown in the figure.

Figure 3:
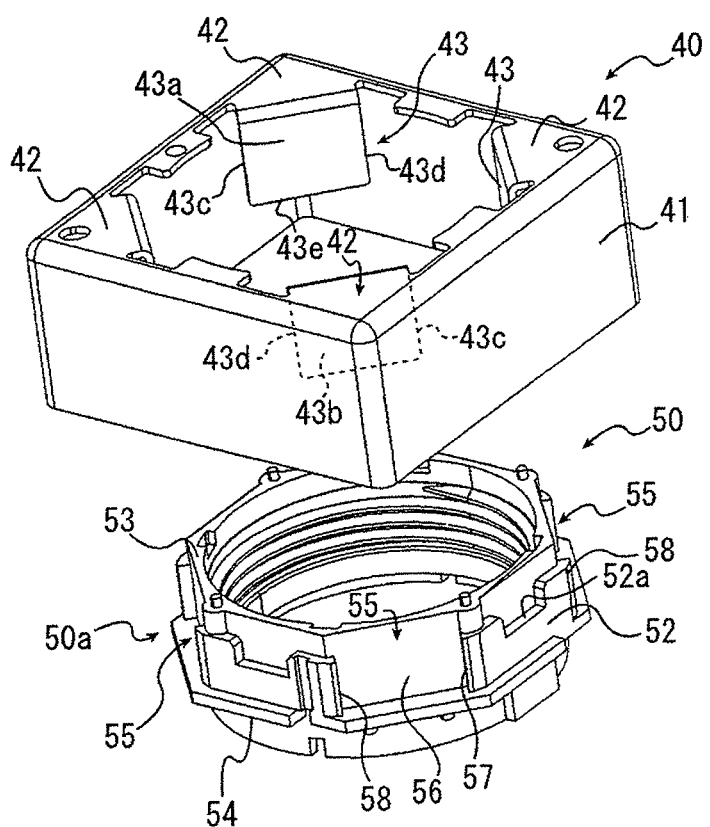
FIG. 3 is an exploded perspective view for explaining the shape of the yoke and the lens carrier.

The detailed structure of the yoke 40 and the lens carrier 50 will be explained using FIG. 3 and FIG. 6. FIG. 3 is a perspective view of the yoke 40 and the lens carrier 50. The outer wall part 41 of the yoke 40 extends in the direction approximately parallel to the optical axis α direction, and has a shape of a bottomless square pillar shape. The connection part 42 is placed at four corners of the outer wall part 41. The connection part 42 extends in a direction approximately perpendicular to the optical axis α direction to the inner wall part 43 towards the optical axis α side from the corner of the outer wall part 41; thereby the outer wall part 41 and the inner wall part 43 are connected.

The inner wall part 43 of the yoke 40 extends in a direction approximately parallel to the optical axis α direction, towards the exiting side from the connection part 42. The inner wall part 43 is closer to the optical axis α than the outer wall part 43, and it is placed so that the coil 48 and the magnet 44 are placed between the outer wall part 41 (refer to FIG. 6). In the present embodiment, the inner wall part 43 comprises the planar shape of approximately rectangle.

The inner wall part 43 comprises the inner face 43a facing the optical axis α side, the outer face 43b facing the outer wall part 41 side (the outer peripheral side), the first side face 43c and the second side face 43d which are approximately parallel against each other and connects the inner face 43a and the outer face 43b, and the tip face 43e which is the end face of the exiting side of the optical axis α.

The inner face 43a of the inner wall part 43 faces the lens carrier 50; and at the part which faces the inner face 43a of the outer peripheral face 50a of the lens carrier 50, the main face 56 at the control part 55 is formed. The outer face 43b of the inner wall part 43 faces the coil 48 (refer to FIG. 6). In the lens holding device 10 according to the present embodiment, the inner face 43a and the outer face 43b of the inner wall part 43 is a planar shape.

As shown in FIG. 3, at the outer peripheral face 50a of the lens carrier 50, the control part 55 is formed at the position facing the inner wall part 43 of the yoke 40. The control part 55 comprises the main face 56 facing the outer peripheral side extending approximately parallel to the optical axis direction, and the first projection face 57 and the second projection face 58 which extends parallel against each other and also approximately parallel to the optical axis α direction by taking the main face 56 in between.

Figure 4:
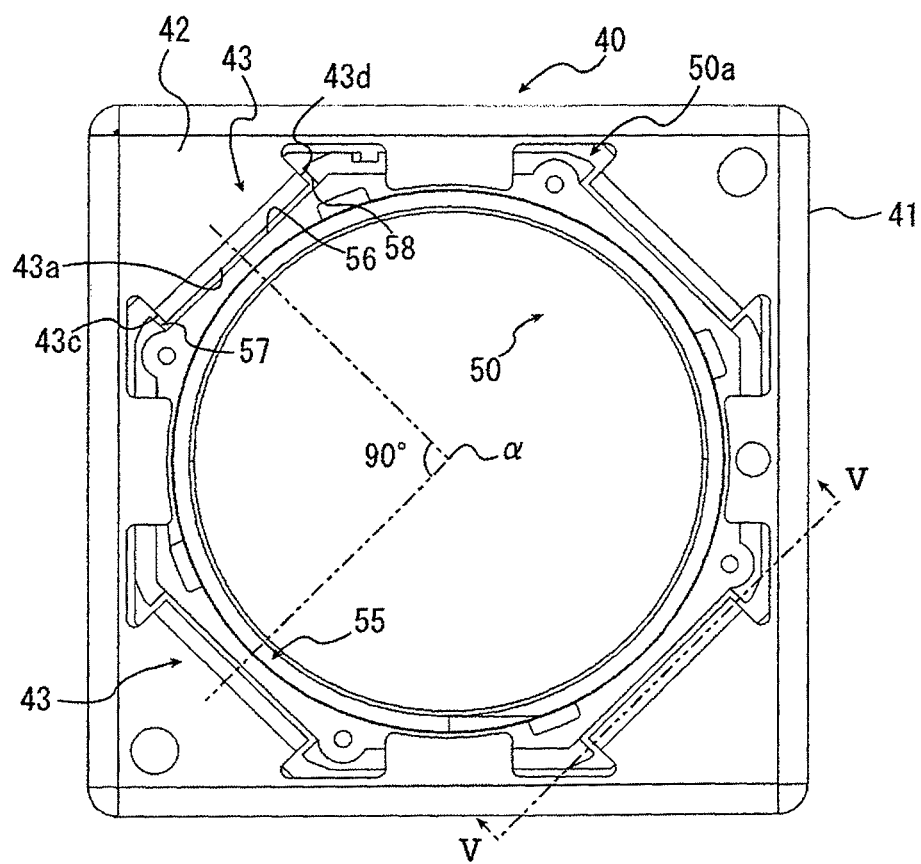
FIG. 4 is a planar view showing the relationship of the placement during the assembling of the yoke and the lens carrier.

As shown in FIG. 4, the main face 56 of the control part 55 faces the inner face 43a of the inner wall part 43 at the yoke 40. The main face 56 of the control part 55 is planar shape as similar to the inner face 43a of the inner wall part 43; and it is placed approximately parallel to the inner face 43a. Also, the first projection face 57 is connected with one of the end part of the main face 56, and faces the first side face 43c of the inner wall part 43 by standing up towards the coil 48 side (the outer peripheral side) from the main face 56. Further, the second projection face 58 is connected with other end part of the main face 56; and faces the second side face 43d of the inner wall part 43 by standing up towards the coil 48 side (the outer peripheral side) from the main face 56 as similar to the first projection face 57.

As shown in FIG. 3, the projection face 57 of the predetermined control part 55 of the lens carrier 50 is connected against the second projection face 58 of adjacent other control part 55 by the coil providing projection 52 as the coil attaching part. The inner peripheral face of the coil 48 is installed so that it is contacts or is close to the coil providing projection 52. The notch 52a is formed at the coil providing projection 52, as the adhesive agent for fixing the coil 48 to said notch 52a; thereby the coil 48 is securely fixed to the lens carrier 50.

In the lens holding device 10 according to the present invention, as shown in FIG. 4, the inner wall part 43 of the yoke 40 is placed as a pair with the control part 55 of the lens carrier 50. Thus, even in case an impact or so is applied from the outside, the control part 55 formed at the outer peripheral face 50a of the lens carrier 50 contacts with the inner wall part 43 of the yoke 40, and the impact which was applied to the lens holding device 10 is absorbed, thus the impact resistance is excellent. Particularly, the control part 55 of the lens carrier 50 comprises inner face 43a of the inner wall part 43 of the yoke 40, the main face 56 facing against the three faces of the first side face 43c and the second side face 43d, and the first projection face 57 and the second projection face 58.

Figure 6:
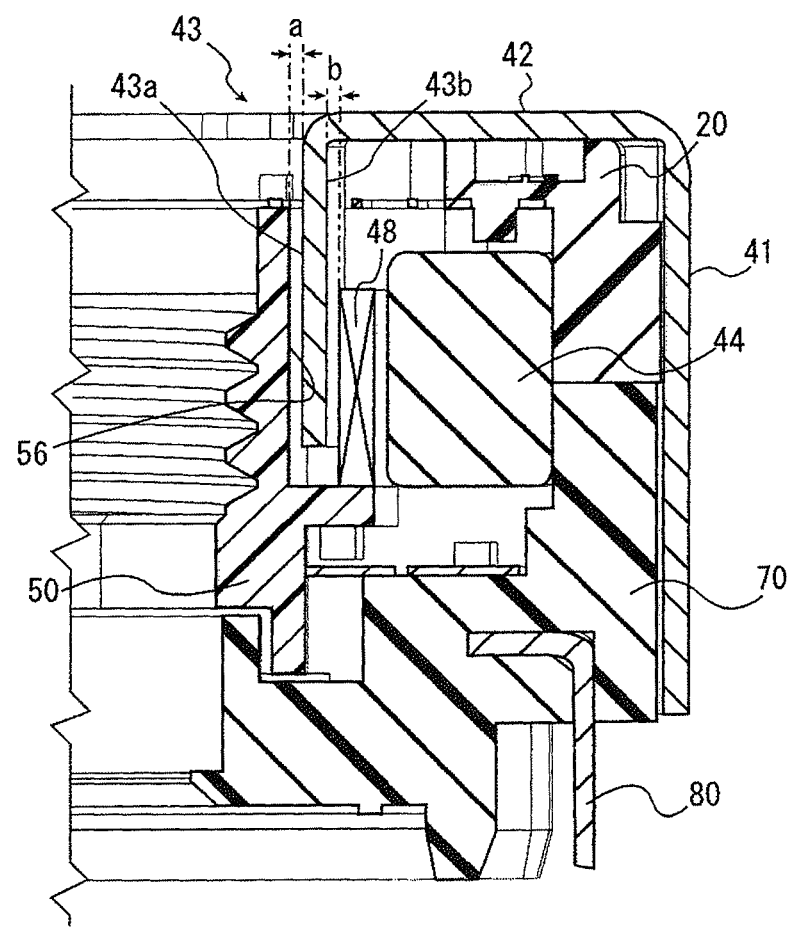
FIG. 6 is partial cross section showing the cross section along VI-VI line in FIG. 1.

As shown in FIG. 6, the main face 56 of the control part 55 faces the inner face 43a of the inner wall part 43 by having a small space in between, and contacts with the inner face 43a, when the axis of the lens carrier 50 tilts due to an unexpected exterior force, or when it tries to make parallel move. The inner face 43a of the inner wall part 43 contacts with the main face 56 of the lens carrier 50, thereby the movement of the lens carrier 50 is limited, and also the impact due to the contact is absorbed by part of the entire yoke 40 including the inner wall part 43 undergoes resilient deformation.

As shown in FIG. 4 and FIG. 6, since the inner wall part 43 and the inner face 43a are planar shape, the space between the inner wall part 43, and the lens carrier 50 and the coil 48 can be controlled in a high accuracy; thus the driving performance of the voice coil motor can be improved. Note that, as shown in FIG. 6, the width "a" which is the direction intercepting perpendicular to the optical axis α of the space between the inner face 43a of the inner wall part 43 and the main face 56 of the lens carrier 50 is preferably smaller than the width "b" which is the direction intercepting perpendicular to the optical axis α of the space between the outer face 43b of the inner wall part 43 and the coil 48. Thereby, the movement of the lens carrier 50 due to the exterior force is effectively limited by the yoke 40, and the impact can be absorbed. Also, the lens holding device 10 can make the space between the inner wall part 43 and the lens carrier 50 small, hence it is advantageous for making it more compact.

As shown in FIG. 4, the yoke 40 has the inner wall part 43 and four connection parts 42 placed at a position which is rotated by approximately 90 degrees taking said optical axis α at a center, and at the outer peripheral face 50a of the lens carrier 50, four control parts 55 which each faces four inner wall parts 43 are formed. The combination of four inner wall parts 43 and the control parts 55 are placed equally around the optical axis α, thereby the movement of the lens carrier 50 can be controlled in a good balance, and the impact caused by the contact of the control part 55 and the inner wall part 43 can be effectively absorbed. Also, the outer wall part 41 of the yoke 40 has a structure which connects four inner wall parts 43 via the connection parts 42, thereby the impact absorbing effect can be enhanced.

As shown in FIG. 5, the first projection face 57 and the second projection face 58 of the control part 55 faces against the first side face 43c and the second side face 43d of the inner wall part 43 by taking a small space between each other; thereby when the lens carrier 50 rotates, it contacts with the first projection face 57 and the second projection face 58. The first side face 43c and the second side face 43d of the inner wall 43 contacts with the first projection face 57 and the second projection face 58 of the lens carrier 50, thereby the rotation of the lens carrier 50 is limited and also the impact can be absorbed.

Also, by forming the first projection face 57 and the second projection face 58 which are approximately parallel to the optical axis α direction, the large facing area between the first side face 43c and the second side face 43d of the inner wall part 43 can be ensured, thus good impact resistance can be exhibited. Also, such first projection face 57 and the second projection face 58 exhibits the effect to prevent the deformation of the cylindrical shape lens carrier 50.

Other Embodiment

The lens holding device 10 as mentioned in the above may be used as the optical device with focusing mechanism and the blur correction mechanism by combining with the voice coil motor which moves the entire lens holding device 10 to the direction perpendicular to the optical axis α. Also, as for the detailed shape of the yoke 40 and the lens carrier 50 or so, it may be appropriately changed in accordance with the shape or so of other members.

NUMERICAL REFERENCES

10 . . . Lens holding device
20 . . . Cap
22 . . . Cap frame part
22a . . . F spring providing face
24 . . . Cap column part
30 . . . F spring
60 . . . B spring
60a . . . B spring R
60b . . . B spring L
32, 62 . . . Outer ring part
34, 64 . . . Inner ring part
36, 66 . . . Arm part
40 . . . Yoke
41 . . . Outer wall part
42 . . . Connection part
43 . . . Inner wall part
43a . . . Inner face
43b . . . Outer face
43c . . . First side face
43d . . . Second side face
43e Tip face
44 . . . Magnet
48 . . . Coil
50 . . . Lens carrier
50a . . . Outer peripheral face
52 . . . Coil providing projection
52a . . . Notch
53 . . . Incidence side inner ring providing part
54 . . . Exiting side inner ring providing part
55 . . . Control part
56 . . . Main face
57 . . . First projection face
58 . . . Second projection face
70 . . . Bottom
72 . . . Bottom frame part
72a . . . B spring providing face
74 . . . Bottom column part
75 . . . Bottom side face
76 . . . Housing groove
80 . . . Connection terminal

The invention claimed is:

1. A lens holding device comprising:
a lens carrier having a cylindrical shape extending in an optical axis direction of a lens and holding said lens at an inner peripheral face side,
a coil provided to a coil attaching part formed at an outer peripheral face of said lens carrier, and
a yoke having an outer wall part extending in a direction substantially parallel to said optical axis direction, an inner wall part extending in a direction substantially parallel to said optical axis direction and provided by placing said coil between said outer wall part which is closer to said lens carrier than said outer wall part, and a connection part extending in the direction substantially perpendicular to said optical axis direction and connecting said outer wall part and said inner wall part; wherein:
said inner wall part has an inner face facing said lens carrier, an outer face which is substantially parallel to said inner face and facing said coil, and a first side face and a second side face substantially parallel against each other and connects said inner face and said outer face;
at said outer peripheral face of said lens carrier, a control part is formed having a main face facing said inner face, a first projection face connected to one of end parts of said main face and faces said first side face by standing up towards said coil side from said main face; and a second projection face connected to other end parts of said main face and faces said second side face by standing up towards said coil side from said main face; and
said first protection face and said second projection face extend substantially parallel to each other in a direction substantially parallel to said optical axis direction.

2. The lens holding device as set forth in claim 1, wherein said inner face of said inner wall part and said main face of said control part are a planar shape.

3. The lens holding device as set forth in claim 1 wherein said yoke has four said inner wall part and four connection parts placed at positions which are rotated by approximately 90 degrees taking said optical axis at a center, and
said outer wall part connects said four connection parts; and
at said outer peripheral face of said lens carrier, four control parts each facing four said inner wall parts are formed.

* * * * *